United States Patent
Sidon et al.

(10) Patent No.: US 11,768,084 B2
(45) Date of Patent: Sep. 26, 2023

(54) AGRICULTURAL MACHINE WITH AN IMPROVED USER INTERFACE

(71) Applicant: Deere & Company, Moline, IL (US)

(72) Inventors: Jeffrey S. Sidon, Des Moines, IA (US); Matthew E. Poush, Des Moines, IA (US); Amy Oetting, Waukee, IA (US)

(73) Assignee: Deere & Company, Moline, IL (US)

( * ) Notice: Subject to any disclaimer, the term of this patent is extended or adjusted under 35 U.S.C. 154(b) by 164 days.

(21) Appl. No.: 16/939,456

(22) Filed: Jul. 27, 2020

(65) Prior Publication Data

US 2022/0026230 A1 Jan. 27, 2022

(51) Int. Cl.

| | |
|---|---|
| *G01C 21/36* | (2006.01) |
| *A01D 41/127* | (2006.01) |
| *A01B 79/00* | (2006.01) |
| *G06F 3/04847* | (2022.01) |
| *G05B 19/042* | (2006.01) |

(52) U.S. Cl.
CPC ......... *G01C 21/367* (2013.01); *A01D 41/127* (2013.01); *G01C 21/3664* (2013.01); *G05B 19/042* (2013.01); *A01B 79/005* (2013.01); *G05B 2219/2637* (2013.01); *G06F 3/04847* (2013.01)

(58) Field of Classification Search
CPC ........................ G01C 21/367; G01C 21/3664; A01D 41/127; G05B 19/042; G05B 2219/2637; A01B 79/005; G06F 3/04847; G06V 20/56
See application file for complete search history.

(56) References Cited

U.S. PATENT DOCUMENTS

| | | | |
|---|---|---|---|
| 5,870,689 A | 2/1999 | Hale et al. | |
| 2007/0043529 A1* | 2/2007 | Johnson | G01C 21/32 |
| | | | 702/150 |
| 2009/0256846 A1* | 10/2009 | Zahariev | G06T 11/206 |
| | | | 345/440 |
| 2014/0247268 A1* | 9/2014 | Drucker | G06T 13/80 |
| | | | 345/440.2 |
| 2015/0046862 A1* | 2/2015 | Hansen | G06K 9/622 |
| | | | 715/771 |

(Continued)

OTHER PUBLICATIONS

Extended European Search Report and Written Opinion issued in European Patent Application No. 21184606.8, dated Dec. 16, 2021, in 11 pages.

*Primary Examiner* — John T Repsher, III
(74) *Attorney, Agent, or Firm* — Joseph R. Kelly; Kelly, Holt & Christenson PLLC

(57) ABSTRACT

A mobile agricultural machine includes ground engaging elements that propel the mobile agricultural machine about an agricultural field. The agricultural machine includes a processor that receives field data indicative of characteristics of portions of the field. The agricultural machine includes a display unit operably coupled to the processor, the display unit configured to display a user interface generated by the processor. The user interface includes a map comprising a plurality of field characteristic indicia, the field characteristic indicia indicative of the characteristics of the portions of the field and the locations of the portions of the field. The user interface also includes a data distribution indicator representing a distribution of the field data and a legend proximate the data distribution indicator.

17 Claims, 9 Drawing Sheets

(56) References Cited

U.S. PATENT DOCUMENTS

| | | |
|---|---|---|
| 2016/0183450 A2 | 6/2016 | Koch et al. |
| 2017/0337642 A1* | 11/2017 | Stuber .................... G06Q 50/02 |
| 2019/0347836 A1* | 11/2019 | Sangireddy .......... A01C 21/005 |
| 2020/0128726 A1 | 4/2020 | Takeda et al. |
| 2020/0311588 A1* | 10/2020 | Watanabe .............. G06N 7/005 |

* cited by examiner

US 11,768,084 B2

AGRICULTURAL MACHINE WITH AN IMPROVED USER INTERFACE

FIELD OF THE DESCRIPTION

This description generally relates to agricultural equipment. More specifically, but not by limitation, the present description relates to a user interface for an agricultural operation.

BACKGROUND

There is a wide variety of different types of agricultural equipment. Some such equipment includes agricultural harvesters, planters, sprayers, unmanned aerial vehicles, etc.

It is common for agricultural equipment to have a variety of sensors that sense characteristics of a field as they travel across the field. Some characteristics include, yield, weed, vegetative index, crop state, elevation, moisture, etc. In some examples, the agricultural equipment geo-locates the sensed characteristics which can later be displayed as an agricultural map.

The discussion above is merely provided for general background information and is not intended to be used as an aid in determining the scope of the claimed subject matter.

SUMMARY

A mobile agricultural machine includes ground engaging elements that propel the mobile agricultural machine about an agricultural field. The agricultural machine includes a processor that receives field data indicative of characteristics of portions of the field. The agricultural machine includes a display unit operably coupled to the processor, the display unit configured to display a user interface generated by the processor. The user interface includes a map comprising a plurality of field characteristic indicia, the field characteristic indicia indicative of the characteristics of the portions of the field and the locations of the portions of the field. The user interface also includes a data distribution indicator representing a distribution of the field data and a legend proximate the data distribution indicator.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

As a machine travels across an agricultural field it will often sense characteristics of the field or the crops in the field. These characteristics can include, but are not limited to, harvest yield, spray fluid applied, soil or crop moisture, weed presence, vegetative index, topography, compaction, etc. The sensed characteristics can be geo-located, such that a map of characteristics across the field, commonly called an agricultural data map, can be created.

Agricultural data maps are often displayed by binning values into specific ranges or data, such that a user can better identify areas of higher versus lower values. Algorithms exist that attempt to bin the data most appropriately based on the underlying distribution of the data. However, users may have additional criteria other than purely statistical analysis. For example, while statistical analysis may find relevant variation in the data, it may not be practically relevant to the management factors the user may consider. Further, typically a statistical method will make assumptions about the underlying distribution of the data, and therefore the result will likely not be a perfect fit.

The user may want to make finer adjustments to the size, number of bins, and breakpoints of the data to be mapped and sometimes a user is able to adjust breakpoints of the bins by manually entering a raw value. However, a user does not have any indication of how those changes relate to the actual distribution of the data. As these changes can create significant differences in the visualization of the map, this could lead to poor management decisions.

Accordingly, a new interactive user interface is presented. In some of the following examples, a bin adjustment mechanism is provided with the underlying data distribution as a visual reference adjacent to the bin adjustment mechanism. In some examples, the visual reference of the underlying data distribution is a histogram. In one example, a second histogram corresponding to the indicia legend (e.g., color, pattern, etc.), bin sizes, and breakpoints is shown overlaid on top of the underlying distribution. Bin adjustment control sliders are then used to manually adjust the size and breakpoint of the bins in one motion. Changes to the control slider position can be synchronized with standard manual entry boxes, such that changes to one result in a change to the other. When a change to the bins is made, the map is then updated in real-time to see the effect.

Figure 1:
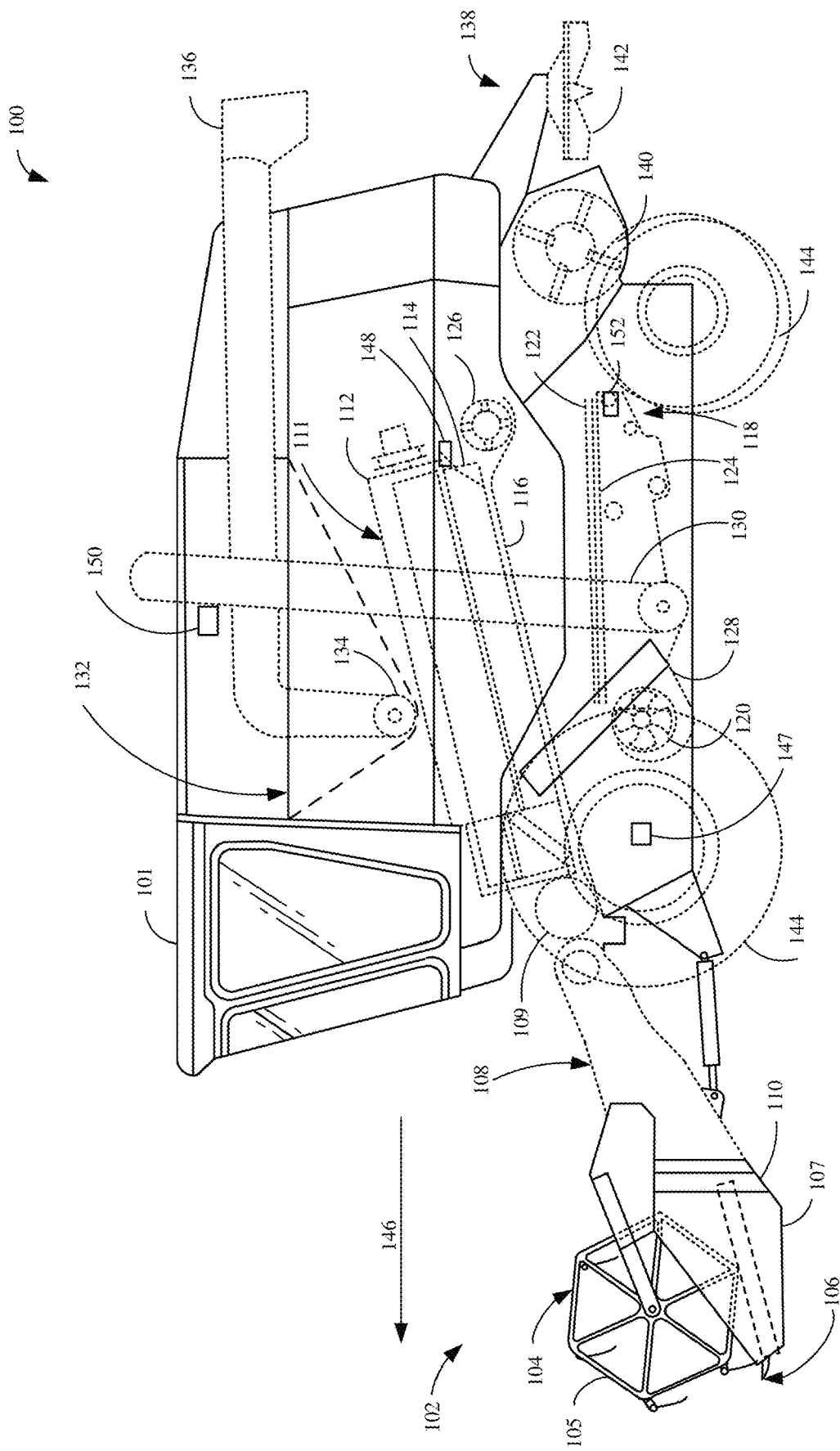
FIG. 1 is a partial pictorial, partial schematic view of one example of a combine harvester.

FIG. 1 is a partial pictorial, partial schematic, illustration of an agricultural machine 100, in an example where machine 100 is a combine harvester (also referred to as combine 100 or machine 100). It can be seen in FIG. 1 that machine 100 illustratively includes an operator compartment 101, which can have a variety of different operator interface mechanisms, for controlling combine 100. Combine 100 includes a set of front end equipment, forming a cutting platform 102, that includes a header 104 having a cutter generally indicated at 106. It can also include a feeder house 108, a feed accelerator 109, and a thresher generally indicated at 111. Thresher 111 illustratively includes a threshing rotor 112 and a set of concaves 114. Further, combine 100 can include a separator 116 that includes a separator rotor. Combine 100 can include a cleaning subsystem (or cleaning shoe) 118 that, itself, can include a cleaning fan 120, chaffer 122 and sieve 124. The material handling subsystem in combine 100 can include (in addition to a feeder house 108 and feed accelerator 109) discharge beater 126, tailings elevator 128, clean grain elevator 130 (that moves clean grain into clean grain tank 132) as well as unloading auger 134 and spout 136. Combine 100 can further include a residue subsystem 138 that can include chopper 140 and spreader 142. Combine 100 can also have a propulsion subsystem or powertrain that includes an engine (or other power source) that drives ground engaging wheels 144 or tracks, etc. It will be noted that machine 100 may also have more than one of any of the subsystems mentioned above (such as left and right cleaning shoes, separators, etc.).

Combine 100 can be equipped with removable cutting platforms that are designed for particular crops. One example, sometimes called a grain platform, is equipped with a reciprocating knife cutter bar, and features a revolving reel with metal or plastic teeth to cause the cut crop to fall into the auger once it is cut. Another example includes a cutter bar that can flex over contours and ridges to cut crops such as soybeans that have pods close to the ground. Some headers designed for wheat, or other similar crops, include draper headers, and use a fabric or rubber apron instead of a cross auger. Often, a draper platform includes one or more draper belts that move severed material, that is harvested from an agricultural field, into a header of the agricultural harvesting machine. In one example, this includes one or more draper belts on each side of the header configured to receive and move severed material to a center section of the agricultural header.

In operation, and by way of overview, the height of header 104 is set and combine 100 illustratively moves through a field in the direction indicated by arrow 146. As it moves, header 104 engages the crop to be harvested and gathers it toward cutter 106. After it is cut, the crop can be engaged by reel 105 that moves the crop to feeding tracks. The feeding tracks move the crop to the center of the header 104 and then through a center feeding track in feeder house 108 toward feed accelerator 109, which accelerates the crop into thresher 111. The crop is threshed by rotor 112 rotating the crop against concaves 114. The threshed crop is moved by a separator rotor in separator 116 where some of the residue is moved by discharge beater 126 toward a residue subsystem. It can be chopped by a residue chopper 140 and spread on the field by spreader 142. In other implementations, the residue is simply dropped in a windrow, instead of being chopped and spread.

FIG. 1 also shows that, in one example, combine 100 can include ground speed sensor 147, one or more separator loss sensors 148, a clean grain camera 150, and one or more cleaning shoe loss sensors 152. Ground speed sensor 147 illustratively senses the travel speed of combine 100 over the ground. This can be done by sensing the speed of rotation of the wheels, the drive shaft, the axle, or other components. The travel speed can also be sensed by a positioning system, such as a global positioning system (GPS), a dead reckoning system, a LORAN system, or a wide variety of other systems or sensors that provide an indication of travel speed.

Figure 2:
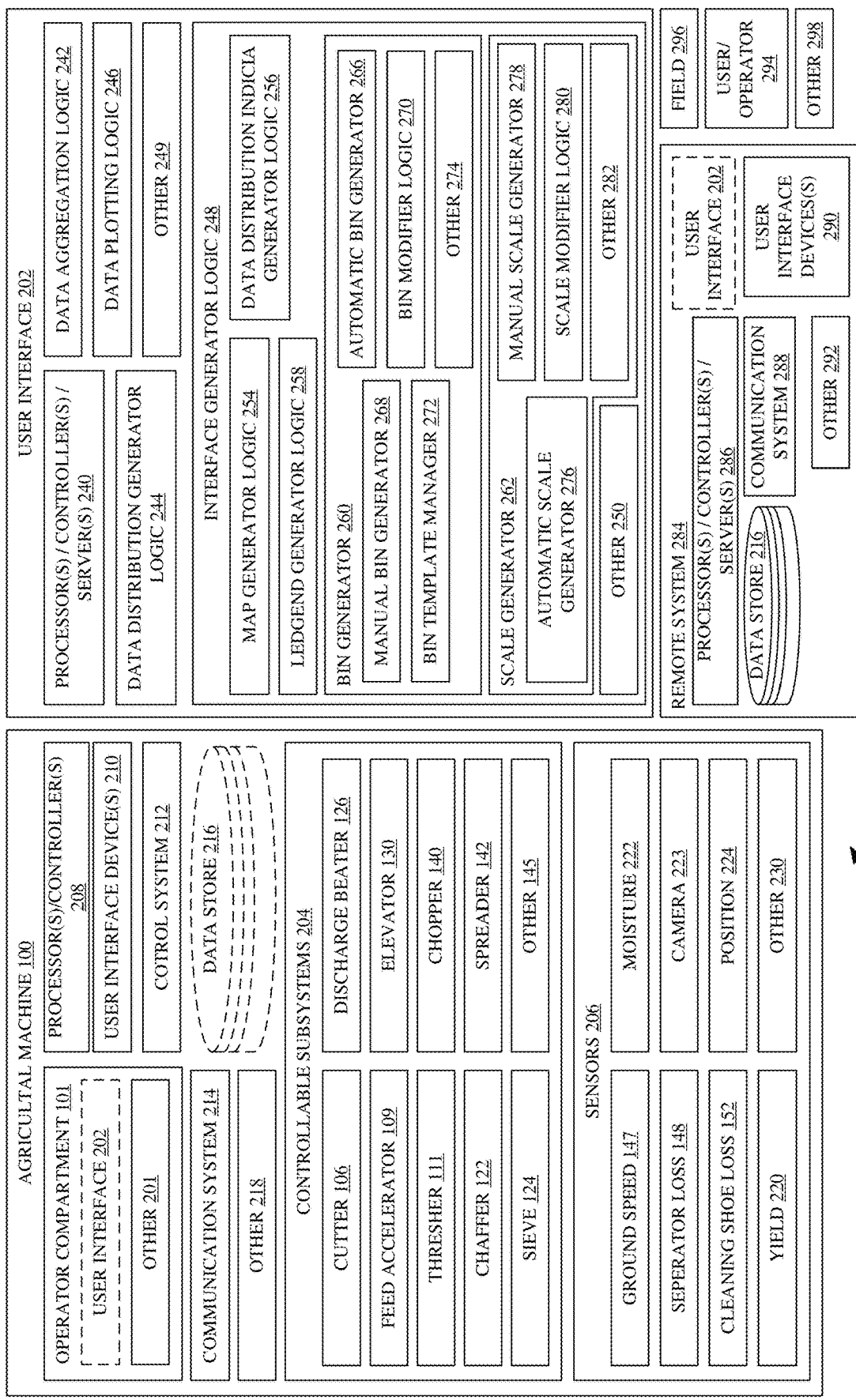
FIG. 2 is a block diagram showing an example agricultural environment

FIG. 2 is a block diagram showing an example agricultural environment 200. Environment 200 includes agricultural machine 100, user interface 202, remote systems 284, operator 294, field 296 but can include other items as well, as indicated by block 298. Agricultural machine 100, as shown is the same agricultural machine from FIG. 1, that is, a combine harvester. However, in other examples, agricultural machine 100 can be a different type of machine as well, such as a seeder, sprayer, tiller, tractor, drone, utility vehicle, etc. Agricultural machine 100 includes an operator compartment 101, controllable subsystems 204, sensors 206, processors/controllers 208, user interface devices 210, a control system 212, a communication system 214, a data store 216 can include other items as well, as indicated by block 218.

Operator compartment 101 can include a user interface 202 which can be displayed on one or more user interface devices 210. The operator compartment 101 can include other items as well, as indicated box 201. User interface 202 will be described in greater detail below.

Controllable subsystems 204 include cutter 106, feed accelerator 109, thresher 111, chaffer 122, sieve 124, discharge beater 126, elevator 130, chopper 140, spreader 142 and can include other items as well, as indicated by block 145. These controllable subsystems have been described in greater detail above with respect to FIG. 1. Controllable subsystems 204 are controlled by control system 212 which can be implemented by processors/controllers 208. In the case of a combine, controllable subsystems 204 propel agricultural machine 100 about field 296 to harvest crop present in field 296. In other cases where agricultural machine 100 is a different type of machine, controllable subsystems 204 implement the intended operation of these machines. For instance, when agricultural machine 100 is a drone or utility vehicle the operation may be to scan field 296 and sense the various characteristics of objects present in field 296. Or, for instance, when agricultural machine 100 is a sprayer, controllable subsystems 204 can include a sprayer to spray one or more of herbicide, pesticide, fertilizer, etc. In other examples, controllable subsystems 204 can include other items as well.

Sensors 206 include ground speed sensors 147, separator loss sensors, 148, cleaning shoe loss sensors 152, yield sensors 220, moisture sensors 222, position sensors 224 and can include other items as well, as indicated by block 230. Some of these the sensors have been described in greater detail above. Yield sensors 220 are able to sense the yield of crop across field 296. In some examples, yield sensors 220 sense characteristics that will predict future yield of crop across field 296. For instance, when agricultural machine 100 is a sprayer, the actual yield cannot be sensed since the crop is not yet being harvested. However, some types of sensors can sense characteristics indicative of yield in the future, such as crop height, density, vegetative index, etc. Moisture sensors 222 can sense the moisture of crop in field 296 or the soil of field 296. Cameras 225 can sense various characteristics of field 296. For instance, crop density or weed indexes can be determined from an image captured by camera 225. Position sensors 224 can sense the current position of agricultural machine 100 and correlate sensor data from other sensors to locations across field 296. In some examples two or more sensors are combined to sense more than one characteristic. For example, a position sensor 224 and yield sensor 220 can both be a camera, in this instance, the pixel value may be indicative of yield (e.g. the presence of the crop) and the pixel location in the image is indicative of position in field 296 (e.g., when the pixels of the camera have been geo-calibrated). Of course, sensors 206 can include other types of sensors as well, as indicated by block 230.

User interface devices 210 can include various items that allow a user/operator 294 to interact with agricultural machine 100 and/or user interface 202. User interface devices 210 can include touchscreens, display devices, buttons, levers, pedals, steering wheels, joysticks, microphones, speakers, haptic devices, etc.

Communication system 214 allows agricultural machine 100 to communicate with other components of environment 200. Communication system 214 can operate on various protocols and networks such as Wi-Fi, Bluetooth, near field communication, local area network (LAN), wide area network (WAN), controller area network (CAN), etc. Agricultural machine 100 can also include a data store 216 which can store various data for the operation of agricultural machine 100.

User interface 202 includes processor(s)/controller(s)/server(s) 240, data aggregation logic 242, data distribution generator logic 244, data plotting logic 246 and interface generator logic 248, but can include other items as well, as indicated by block 249. Processor(s)/controller(s)/server(s) 240 can implement the various logic and generator components described below.

Data aggregation logic 242 receives data from a data source related to characteristics of field 296. For instance, data aggregation logic 242 receives data from sensors 206 of one or more agricultural machine(s) 100 or from data store 216 where data has been previously collected and stored. Data aggregation logic 242 can perform various aggregation, cleaning or organization operations on the data. For instance, some operations can include noise removal, removing clear errors, filtering, etc. In some examples, data aggregation logic 242 aggregates data from several sources to generate a dataset indicative of characteristics across field 296.

Data distribution generator logic 244 calculates a data distribution of the data indicative of characteristics of field 296. Data distribution generator logic 244 can count the plurality of different data values and generate a data distribution model based on the value counts. For instance, data distribution generator logic 244 creates a data table having a column corresponding to a data value and a second column corresponding to the frequency or count of the corresponding first column value in the data set (e.g., a data set representing field 296 or across some portion of field 296 or a larger area than field 296).

Data plotting logic 246 plots the data indicative of characteristics of field 296 and associates their values with the positions where the values were sensed. For instance, data plotting logic 246 creates a new data table where each row includes field characteristic values in a first column and a position in one or more additional columns (e.g., latitude and longitude).

Interface generator logic 248 includes map generator logic 254, data distribution indicia generator logic 256, legend generator logic 258, bin generator logic 260, scale generator 262 and can include other items as well, as indicated by block 249. Interface generator logic 248 generates an interface that user/operator 294 can interact with. Interface generator logic 248 can allow a user/operator 294 to view various characteristics of field 296 in various different ways that can emphasize data that might be otherwise disregarded.

Map generator logic 254 generates a map of field 296. Map generator logic 254 can also plot characteristic data across the map indicating characteristics of field 296 by geographic location in field 296. For example, map generator logic 254 displays a "satellite" image of the field and overlays visual indicia (e.g., a color, pattern, etc.) over the satellite image of the field, each part of the visual indicia representing a characteristic of the field at the portion of the field where it is overlaid. Legend generator logic 258 generates a legend that indicates the values represented by the visual indicia plotted on the map generated by map generator logic 254. A legend can include various bins and/or scales generated by bin generator 260 and scale generator 262, respectively.

Data distribution indicia generator logic 256 generates a user interface element that displays the data distribution of the field characteristic data. Some examples of data distribution indicia can include histograms, scatterplots, frequency polygons, etc.

Bin generator 260 generates bins in which the characteristic data along the data distribution is divided into. Each bin represents a range of values. The data corresponding to each bin can be displayed visually distinct from other bins on the map generated by map generator logic 254. For example, a first bin can represent high-medium values and a second bin can represent medium-low values. In this example, the first bin may be represented by green visual indicia and the second bin may be represented by red visual indicia.

Automatic bin generator 266 automatically generates the bins. For instance, automatic bin generator 266 can evenly distribute a plurality of bins from the maximum to minimum values in the data set, regardless of value frequency. Or, for instance, automatic bin generator 266 can naturally generate the bins, that is, by matching the plurality of bins based on data distribution, such that all bins have an equal or similar amount of data points in them.

Manual bin generator 268 generates user interface elements/mechanisms that a user/operator 294 can interact with to manually modify the bins. For example, manual bin generator 268 can generate a slider that allows a user to edit the range value of one or more bins. Or, for example manual bin generator 268 can generate text boxes that allow a user to enter values that correspond to a value range limit of one or more bins.

Bin modifier logic 270 allows a user to modify the current bins. Bin modifier logic 270 generates user interface elements/mechanisms that allow a user/operator 294 to modify the bins. For example, bin modifier logic 270 generates user interface mechanisms that allow a user to create a new, delete an existing bin, or merge existing bins.

Bin template manager 272 generates user interface mechanisms that allow a user/operator 294 to create, manage and/or delete or use bin templates. Bin templates can store bin ranges and settings (e.g., their visual indicia, etc.) from past jobs that can be used for present or future jobs on user interface 202. Bin templates allow a user to visualize a one-to-one comparison of characteristics of two or more agricultural operations.

Scale generator 262 allows a user to generate user interface mechanisms corresponding to a continuous scale. A scale can include various reference points that determine how data points are distributed across the scale. Reference points can include maximum, minimum, and/or one or more medium reference points. The location of the data value on the scale determines how the data points on the map with that data value is displayed.

Automatic scale generator 276 automatically generates the scale. For instance, automatic scale generator 276 can evenly distribute the values in the data set across a color gradient. Or, for instance, automatic scale generator 276 can naturally generate the scale, that is, by matching the plurality of scale reference points based on the data distribution, e.g., such that the minimum value corresponds to a minimum reference point and a maximum value corresponds to a maximum reference point.

Manual scale generator 278 generates user interface elements/mechanisms that a user/operator 294 can interact with to manually modify the scale. For example, manual scale generator 278 can generate a slider that allows a user to edit the range value of one or more scale reference points (e.g., minimum value, medium value, maximum value, etc.). Or, for example manual scale generator 278 can generate text boxes that allow a user to enter values that correspond to the scale reference points.

Scale modifier logic 280 allows a user to modify the current scale. Scale modifier logic 280 generates user interface elements/mechanisms that allow a user/operator 294 to modify the scale. For example, scale modifier logic 280 generates user interface mechanisms that allow a user to create a new reference point, delete an existing reference point, or merge existing reference points. Or, for example, scale modifier logic 280 generates user interface mechanisms that allow a user to change the visual indicia of the scale (e.g., the gradient pattern and colors).

Remote system 284 includes processor(s)/controller(s)/server(s) 286, communication system 288, user interface devices 290, data store 216, user interface 202 and can include other items as well, as indicated by block 292. Remote systems 284 can include a variety of different systems, for instance, a personal computer, a workstation, a server, a mobile cellular device, a tablet, etc. User/operators 294 that are remote from agricultural machine 100 can utilize a remote system 284 to view data indicative of characteristics of field 296. Communication system 288 of remote system 284 allows communication with agricultural machine 100 and other components of environment 200. Communication system 288 can operate on various protocols and networks such as Wi-Fi, Bluetooth, near field communication, local area network (LAN), wide area network (WAN), controller area network (CAN), etc.

Data store 216 stores data for the operations in agricultural environment 200. For example, data store 216 can store the data indicative of characteristics of field 296. Data store 216 can also store bin templates and other stored settings of a user/operator 294.

User interface device(s) 290 allow a user/operator 294 to interact with remote system 284. For example, user interface devices 290 include touch screens, displays, mouse, keyboard, buttons, haptic devices, speakers, microphones, etc. Of course, remote system 284 can include other items as well, as indicated by block 292.

Figure 3:
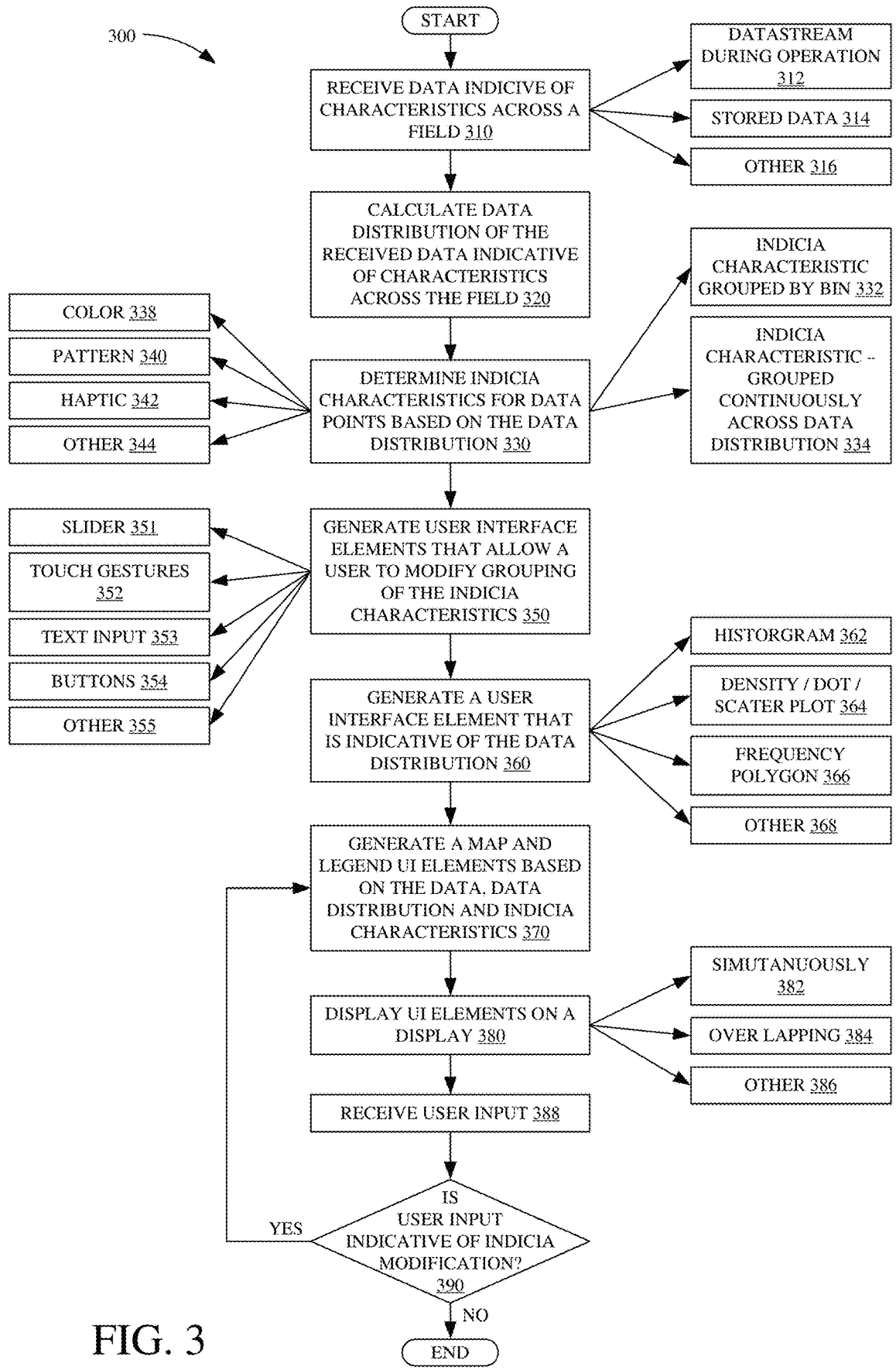
FIG. 3 is a flow diagram showing an example method of generating a user interface.

FIG. 3 is a flow diagram showing an example method of generating a user interface. Operation 300 begins at block 310 where data indicative of characteristics across a field are received. As indicated by block 312, this data may be streamed during an agricultural operation on the field. For instance, a harvester traveling across the field harvesting crop senses yield as the field is harvested and the sensed yield is fed into a data stream. In another example, an agricultural operation may be a drone flying over the field sensing characteristics of the field and feeding the sensed data into a data stream. As indicated by block 314, the data can be received from some type of data storage. For instance, an agricultural machine 100 that does not have network connectivity can store the data in a database for later processing/display in a user interface. Of course, the data indicative of characteristics of the field can receive in other ways as well, as indicated by block 316.

Operation 300 proceeds at block 320 where the data distribution of the received data indicative of characteristics across the field is calculated. For example, data distribution generator logic 244 can count the plurality of different data values and generate a data distribution model based on the value counts. In some examples, raw data values are rounded to the nearest number or rounded to some number increment (e.g., based on sensor precision or a number significant of a deviation in the sensed characteristic).

Operation 300 proceeds at block 330 where characteristics of indicia for data points are determined based on the data distribution. Indicia characteristics can include color, as indicated by block 338. For example, values in a high yield range can be colored green, values in a medium yield range can be colored yellow and values in a low yield range can be colored red. In some examples, colors are chosen to be accessible for colorblind user/operators 294. Indicia characteristics can include a pattern, as indicated by block 340. For example, a dense pattern can indicate a value in high yield range, a medium density pattern indicates a value in a medium yield range and a sparse pattern indicates a value in a low yield range. Indicia characteristics can be haptic, as indicated by block 342. For instance, when a user interface device includes haptic feedback, various areas of field 296 having different characteristics can have different haptic characteristics such as height, friction, etc. Of course, indicia characteristics can include other indicators as well, as indicated by block 344.

As indicated by block 332, the indicia characteristics can be grouped by ranges of values (e.g., bins). For example, five different bins can be arranged to include the ranges of values across the data distribution. In some examples, portions of the data are not in any bin, and thus is not displayed on the map. As indicated by block 334, the indicia characteristics can be determined in a continuous spectrum across the data distribution. For example, each set of distinct values has a different indicia than adjacent sets of distinct values, subject to limitations of a display medium and/or the human eye to perceive a difference between indicia. For instance, a display may have the limitation of only displaying two-hundred and fifty-six colors, while there are five-hundred and twelve distinct characteristic values, in this case, some of the distinct characteristic values would share a color with their adjacent values. Of course, the indicia characteristics can be grouped in other ways as well, as indicated by block 336.

Operation 300 proceeds at block 350 where user interface elements that allow a user to modify value bins and or indicia characteristics are generated. As indicated by block 351, a slider can be generated that when slid in one direction increases the value range of a bin and slid in the other direction decreases the value range of the bin. As indicated by block 352, touch gestures can be activated to allow user to modify the value range of the bin. For example, pinching a bin object lowers the range of the bin and spreading the bin object increases the value range of the bin. As indicated by block 353, text input boxes can be generated. These text input boxes allow user to enter raw values or metric values that correspond to the value ranges of the bins. As indicated by block 354, buttons can be generated that allow user to modify bins. For instance, a button may be generated that adds an additional bin to the set of bins. Or, for instance, a button can be generated that removes a bin from the set of bins.

Of course, other user interface elements may also be generated that allow a user to modify one or more bins, as indicated by block 355. For example, user interface elements can be provided that allow a user to change visual or haptic characteristics of the bin which will affect how the values that are in each bin on the map are presented to a user. Or for example, user interface mechanism can be provided that removes all bins and creates a continuous scale interface. Some of the generated user interface elements can allow the user to change the visual indicia in the continuous scale, change the scale reference points, etc.

Operation 300 proceeds at block 360 where a user interface element that is indicative of the data distribution is generated. As indicated by block 362, a histogram indicative of the data distribution can be generated. As indicated by block 364, a density, dot, or scatter plot can be generated, that is indicative of the data distribution. As indicated by block 366, a frequency polygon can be generated that is indicative of the data distribution.

Operation 300 proceeds at block 370 where a map and adjustable legend user interface elements based on the data, data distribution, bins and bin indicia characteristics are generated. For example, FIG. 4 (described in more detail below) shows examples of these generated items (e.g., map 402, adjustable legend window 404 and edit legend window 406).

Operation 300 proceeds at block 380 where the generated UI elements of block 370 are displayed on a display. As indicated by block 332, these elements can be displayed simultaneously. For instance, all the user interface elements are displayed on the same screen or multiple screens at the same time. As indicated by block 334, some of these user interface elements may be overlapping one another. For example, the user interface elements representing bins (and in some cases allow for modification of the bins) can be displayed over top of the user interface elements indicative of the data distribution. Of course, the user interface elements can be displayed on the display in other ways as well, as indicated by block 386. For example, some of the interface elements may have varying opacity. For instance, the interface elements representing bins may be overlapping the data distribution elements but have some amount of transparency so that the data distribution elements are still visible.

Operation 300 proceeds at block 388 where user input is received. If the user input is indicative of bin or continuous scale modification then operation 300 proceeds again at block 370 where the interface is re-generated (e.g., and the map is updated based on the changes). If the user input is not indicative of bin or continuous scale modification then operation 300 ends. Of course, a user can resume operation 300 again at one or more of the described blocks after operation 300 ends.

Figure 4:
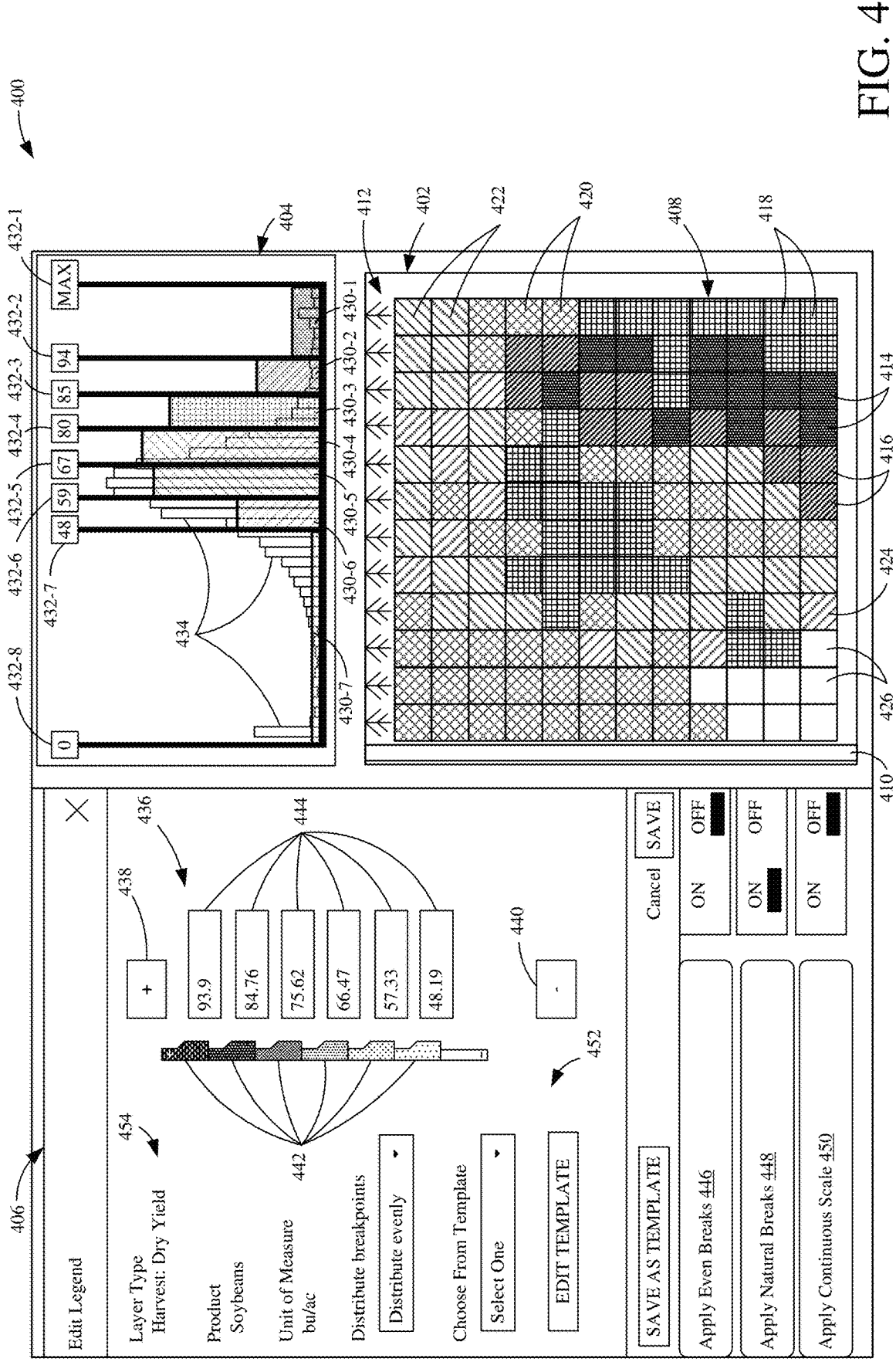
FIG. 4 is a diagram showing an example interface.

FIG. 4 is a diagram showing an example interface 400. Interface 400 includes map window 402, adjustable legend window 404 and edit legend window 406. Map window 402 includes a field 408 which includes field portions 414, 416, 418, 420, 422, 424, and 426. As shown, these field portions are the same size and located in a grid pattern. However, in other examples the field portions can be different sizes and arranged according to where the data was collected (which may not correspond to a distinct grid). Map window 402 also includes a road 410 and tree line 412. Road 410 and tree line 412 may or may not be shown to a user viewing interface 400. Road 410 and tree line 412 are examples of contextual information that can be displayed a user such that they are able to judge the orientation and scale of field 408. In some examples, road 410 and tree line 412 can be portions of an aerial image. Map window 402 can also include a scale that indicates the scale of map 402 (not shown in FIG. 4). Each field portion is patterned with a different pattern which is indicative of the characteristic of the field at that location on the map 402. In other examples, each field portion could be visually distinct in ways other than patterns as well (e.g., color). Values corresponding to each pattern can be displayed in adjustable legend 404. As shown, field 408 is completely overlaid by field portions 414-426, in other examples, some portions of field 408 (or map window 402 overall) may not be overlaid by a field portion having visual or other indicia. These portions of field 408 may signify areas where data, indicative of the presently view characteristic, was not collected.

Adjustable legend 404 includes bins 430-1, 430-2, 430-3, 430-4, 430-5, 430-6 and 430-7. Which will collectively be referred to as bins 430. Bins 430 are created, for example, by bin generator 260. Bins 430 define a value range and encompass data points in the data distribution that fall within that range. For example, bin 430-7 includes data points that have a value of zero to forty-eight bushels per acre and bin 430-2 includes data points that are in a range of eighty-five to ninety-four bushels per acre. Each bin 430, as shown, has a visual indicia (e.g., a pattern) that corresponds to patterns of field portions in map 402. Accordingly, field portions in map 402 that have the corresponding patterns to those of one of bins 430 have characteristic values that fall within the range of that bin 430. The location of the field portion in map 402 indicates the geographic location of the characteristic value. Map 402 is generated by, for example, map generator logic 254.

Histogram 434 is generated by data distribution indicia generator logic 256. Histogram 434 is displayed beneath bins 430 and represents the data distribution field characteristic dataset. Each bar in histogram 434 is indicative of the amount of data points at a given data value (e.g., values increase in the X-axis, the frequency of these values are defined by the Y-axis). For instance, bars to the left are indicative of lower values and bars the right are indicative of higher values and in the present histogram Adjustable legend 404 also includes bin adjusters 432-1, 432-2, 432-3, 432-4, 432-5, 432-6, 432-7 and 432-8, referred to collectively as bin adjusters 432. Bin adjusters 432 can access functions of bin modifier logic 270, e.g., adjusters 432 allow a user to adjust adjacent bins 430. For instance, shifting adjuster 432-2 adjusts both bin 430-2 and 430-1. For instance, shifting bin adjuster 432-2 to the right will increase the size of bin 430-2 and decrease the size of bin 430-1. In some cases, actuating bin adjuster 432 in a certain way can delete the division between two bins and merge the bins 430 together. For instance, where interface 400 is on a touchscreen, swiping bin adjuster 432-2 board removes the division between bin 430-1 and bin 430-2 thus merging the bins into a new bin. As bins 430 are adjusted map generator logic 254 also updates the map to reflect the changes.

Edit legend window 406 includes a data summary section 454, a bin management section 436, and a template management section 452. Data summary section 454 includes information on the measured characteristic, referred to as a layer. As shown, the measured characteristic is a harvest measurement, in dry yield of soybeans in the unit of measure, bushels per acre. In some examples, the layer can be toggled between different measured characteristics and the unit of measure can be toggled from one unit to another.

Bin management section 436 includes raw value inputs 444, bin indicia characteristic adjusters 442, new bin button 438 and remove bin button 440. These user interface mechanisms allow a user to adjust various aspects of bins 430 in adjustable legend 404. For instance, a user can activate manual bin generator 268 and add a new bin by actuating new bin button 438 or remove a bin by actuating remove bin button 440. User can adjust the bin value ranges by entering raw values manually into raw value input inputs 444 which causes bin modifier logic 270 to adjust the bin value ranges. Changes to raw value inputs 444 is synchronized with synchronized bin adjusters 432, such that changes to one result in a change to the other.

A user can adjust the visual indicia character visual characteristic by actuating one of the visual indicia characteristic adjusters 442. For example, actuating one of these adjusters 442 allows user to select a pattern or color that will be displayed on map 402 for data corresponding to a given bin (e.g., values shown in value inputs 444). Bin modifier logic 270 provides the functionality to change the visual indicia characteristics of bins and map generator logic 254 can update the map to reflect the changes. Template management section 452 allows a user to save the current settings as a template and load them for a later usage. A template can allow for consistency across agricultural operations.

Even break toggle 446 activates automatic bin generator 266 to toggle even distribution of bins 430 (and move bin adjusters 432 accordingly) evenly across the data distribution. For example, the range of bins is divided evenly amongst the range of the data distribution regardless of data point frequency across the distribution. Using this option when the values are distributed atypically (e.g., tilted to one side, or highly distributed in the range of few bins) typically creates a map that is hard to read or misrepresents the data collected.

Natural break toggle 448 will activate automatic bin generator 266 to toggle adjustment of bin adjusters 432/bin breaks to natural positions. That is, positions which would render the sizing of bins 430 such that they most closely represented the data distribution represented by histogram 434. As can be seen in adjustable legend 404 bins 430 behind size of bins 430 fairly closely represent the same trend as histogram 434.

Continuous scale toggle 450 activates scale generator 262 to modify adjustable legend 404 to apply a continuous scale rather than discrete bins 430. An example of a continuous scale is presented in FIGS. 6A and 6B (described in more detail below).

Figure 5A:
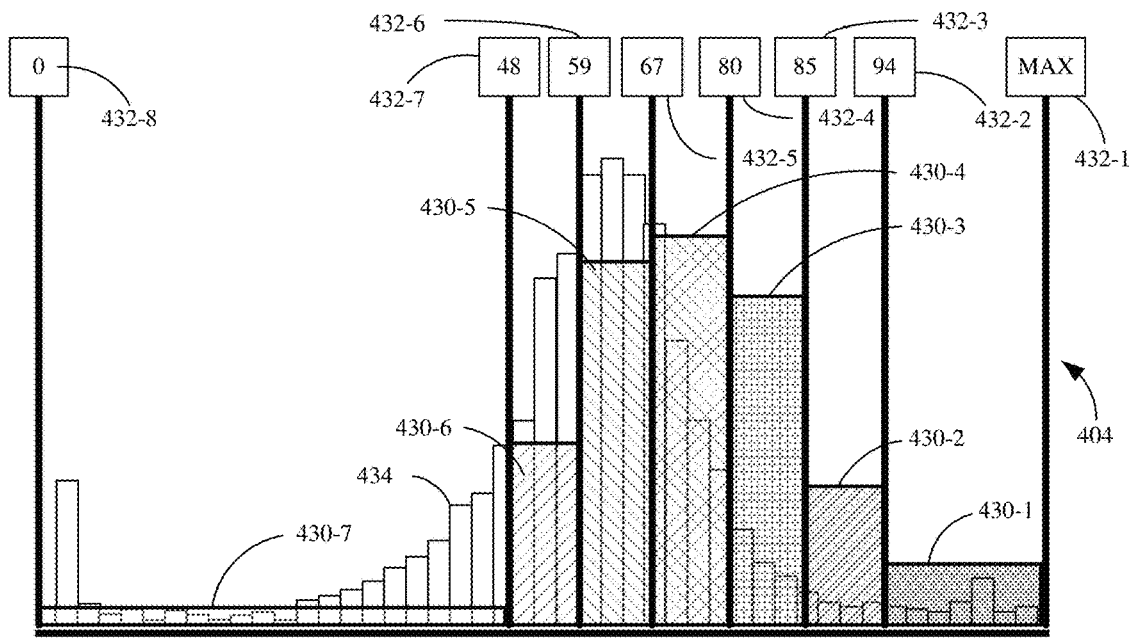
FIGS. 5A and 5B are diagrams showing portions of an example interface.
Figure 5A:
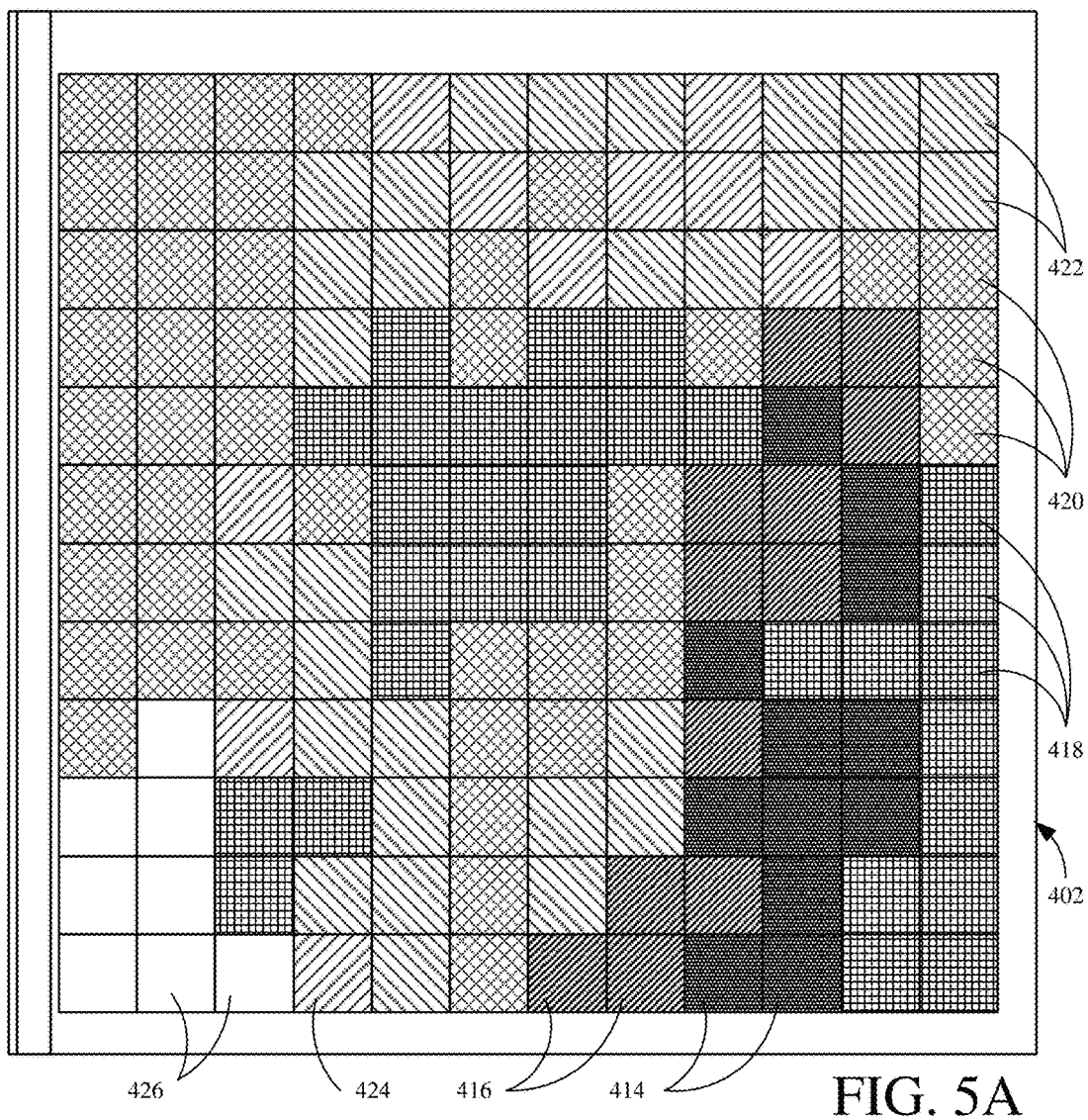
Figure 5B:
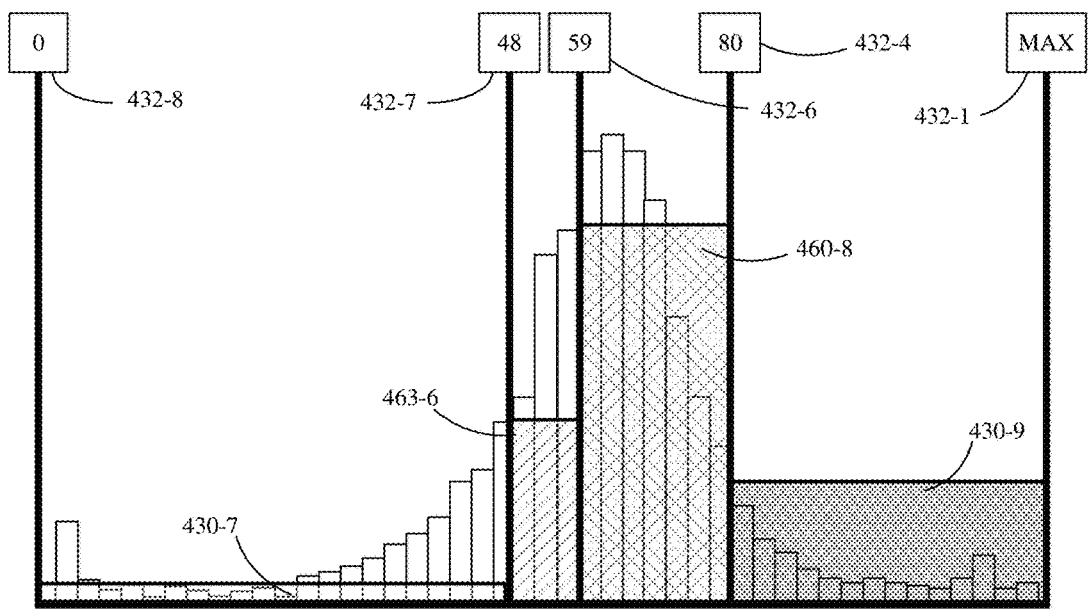
Figure 5B:
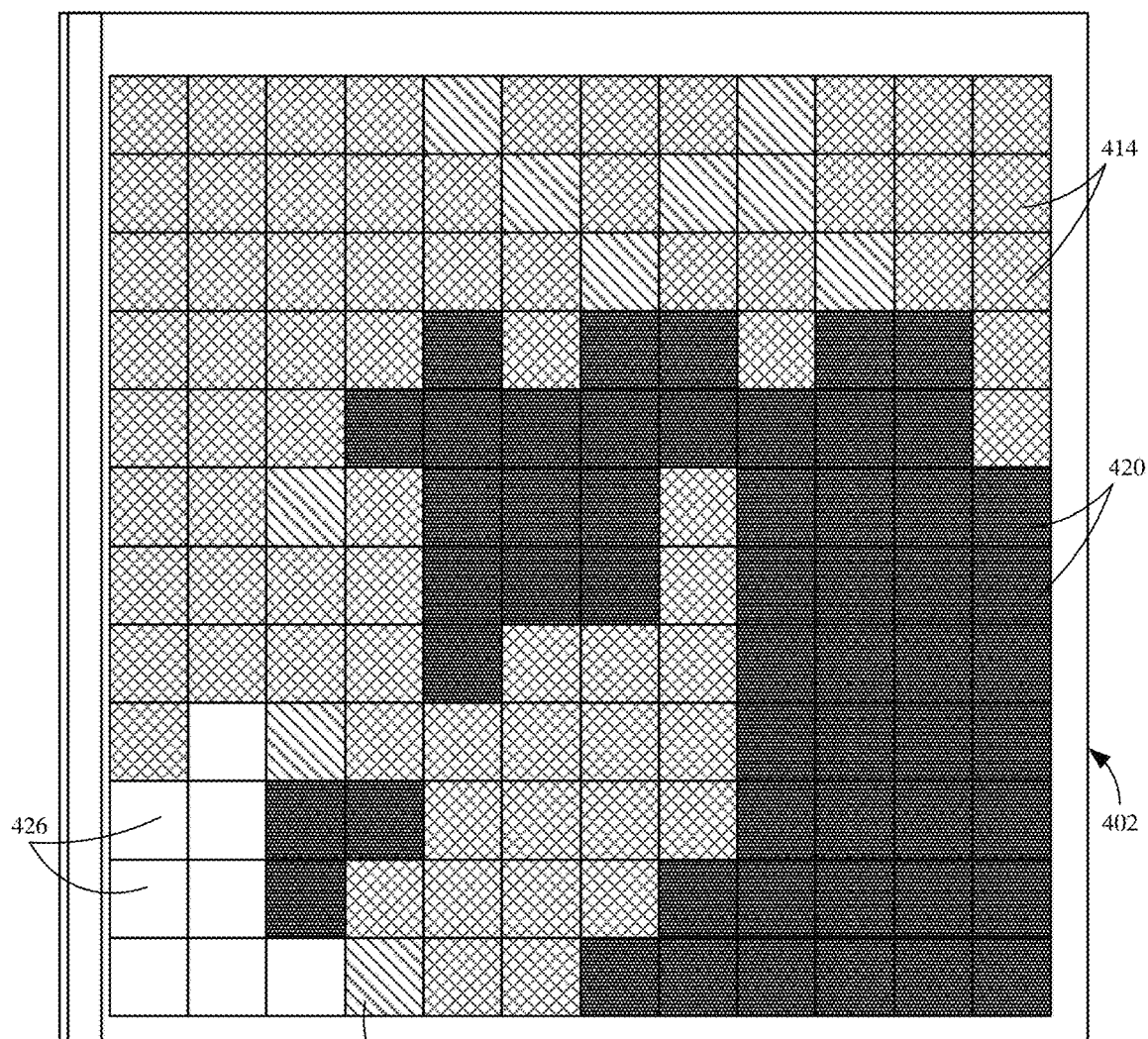

FIGS. 5A and 5B show example portions of the interface of FIG. 4. Specifically, FIGS. 5A and 5B show the adjustment of bins 430 and their effect on map 402. In FIG. 5A, there is quite a bit of diversity in the visual indicia of map 402. Bin 430-1 corresponds to field portions 414, bin 430-2 corresponds to field portions 424, bin 430-3 corresponds to field portions 418, bin 430-4 corresponds to field portions 420, bin 430-5 corresponds to field portions 422, bin 430-6 corresponds to field portions 424, and bin 430-7 corresponds to field portions 426. While in FIG. 5B, there is little variance in the visual indicia of map 402. This is because in FIG. 5B, bins 430-3 and 430-4 have been merged by bin modifier logic 270 to form bin 430-8. A user could have merged these bins by moving one or more bin adjusters 432. For instance, bin adjuster 432-4 could have been actuated such that bin adjuster 432-4 is removed. Or for instance, bin adjuster 432-5 could have been actuated onto bin adjuster 432-3 or vice versa. Bin 430-9 has been formed by merging bins 430-1 and 430-2. As updated, bin 430-8 corresponds to field portions 414, bin 430-9 corresponds to field portions 420, bin 430-6 corresponds to field portions 424, and bin 430-7 corresponds to field portions 426.

Figure 6A:
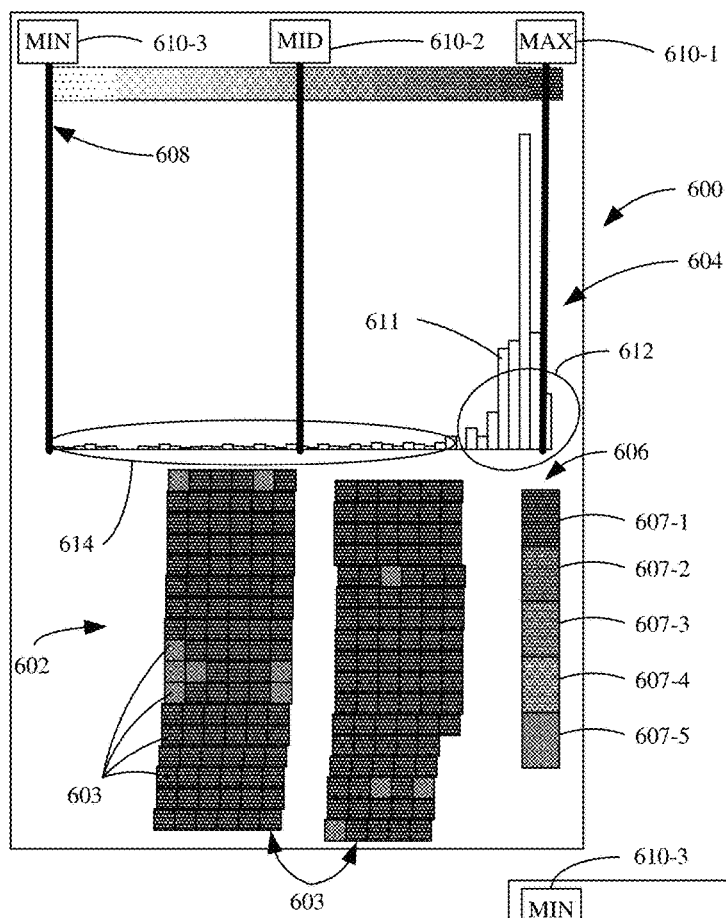
FIGS. 6A and 6B are diagrams showing an example interface.

FIG. 6A is a diagram showing an example interface 600. Interface 600 includes a map portion 602, a distribution portion 604 and a legend 606. Map 602 is generated by map generator 254 and includes two fields 603 each broken into field portions 605. Field portions 605 are shown at a given resolution, in other examples, field portions 605 may have greater or less granularity by increasing or decreasing the resolution of each field portion 605. For instance, each field portion 605 could represent the sample and geolocation rate of a sensor on a machine crossing field 603. Each field portion 605 has a corresponding characteristic value indicative of a characteristic of that physical portion of field 603. The value of the field portion can be estimated by legend 606 that is generated by legend generator logic 258. A continuous scale is often desirable so that fine details can be seen in the spatial representation of the data, which binning can hide. In a standard continuous scale, a contrast is linearly or normally applied across the data value range from a minimum (proximate mechanism 610-3) to a maximum (proximate mechanism 610-1). Mechanisms 610-1, 610-2 and 610-3 can be adjusted independently, which changes parameters of the contrasting algorithm such that the scale is no longer linear. Continuous scales, however, can be difficult to interpret when there is a tight distribution centered around particular values, but there are still values of interest at the tail of the distribution that should not be filtered.

Legend 606 includes indicators 607-1, 607-2, 607-3, 607-4, and 607-5. The visual indicia of field portions 605 are on a spectrum and the legend indicators 607 allow a user to estimate the values across fields 603. Indicator 607-1 represents field portions that have yielded one-hundred and seventy-seven bushels per acre of beans. Indicator 607-2 represents field portions that have yielded one-hundred and fifty bushels per acre of beans. Indicator 607-3 represents field portions that have yielded one-hundred and forty-five bushels per acre of beans. Indicator 607-4 represents field portions that have yielded one-hundred and forty bushels per acre of beans. Indicator 607-5 represents field portions that have yielded one-hundred and thirty-five bushels per acre of beans. With this scale it is unclear which areas of fields 603 have yielded which amount. This is because the data is highly concentrated in portion 612 and sparsely concentrated in portion 614. The data in portion 614 is still relevant to an operator and would be beneficial to see more clearly.

Figure 6B:
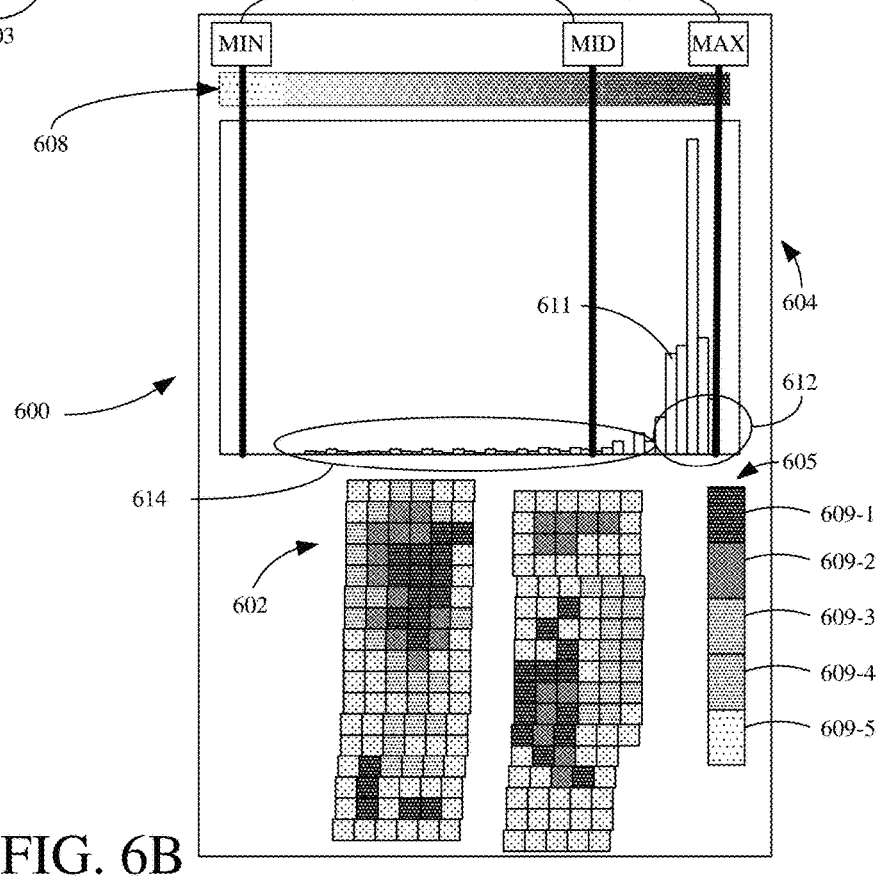

FIG. 6B is a diagram showing an example interface 600 after a continuous scale shift has taken place. In this instance, the data being presented is the same as FIG. 6A as can be seen by histogram 611 being the same in both FIGS. 6A and 6B. The data is still distributed the same amongst portions 612 and 614. However, middle scale adjustment mechanism 610-2 has been shifted towards the densely populated portion 612. Shifting mechanism 610-2 towards the densely populated portion allows for more granularity across the entire legend 606. This is because middle scale adjustment mechanism 610-2 is closer to max scale adjustment mechanism 610-1, which will limit the amount of patterns that the densely populated data will be represented by (609-1, 609-2) and open up the amount of patterns that the sparsely populated date will be represented by (609-3, 609-4, 609-5). In some examples, actuating mechanisms 610-1 or 610-3 will automatically adjust mechanism 610-2.

Indicator 609-1 represents field portions that have yielded one-hundred and seventy-seven bushels per acre of beans. Indicator 609-2 represents field portions that have yielded one-hundred and fifty-four bushels per acre of beans. Indicator 609-3 represents field portions that have yielded one-hundred and forty bushels per acre of beans. Indicator 609-4 represents field portions that have yielded one-hundred and twenty-seven bushels per acre of beans. Indicator 609-5 represents field portions that have yielded one-hundred and ten bushels per acre of beans.

The present discussion has mentioned processors and servers. In one example, the processors and servers include computer processors with associated memory and timing circuitry, not separately shown. They are functional parts of the systems or devices to which they belong and are activated by and facilitate the functionality of the other components or items in those systems.

Also, a number of user interface displays have been discussed. They can take a wide variety of different forms and can have a wide variety of different user actuatable input mechanisms disposed thereon. For instance, the user actuatable input mechanisms can be text boxes, check boxes, icons, links, drop-down menus, search boxes, etc. They can also be actuated in a wide variety of different ways. For instance, they can be actuated using a point and click device (such as a track ball or mouse). They can be actuated using hardware buttons, switches, a joystick or keyboard, thumb switches or thumb pads, etc. They can also be actuated using a virtual keyboard or other virtual actuators. In addition, where the screen on which they are displayed is a touch sensitive screen, they can be actuated using touch gestures. Also, where the device that displays them has speech recognition components, they can be actuated using speech commands.

A number of data stores have also been discussed. It will be noted they can each be broken into multiple data stores. All can be local to the systems accessing them, all can be remote, or some can be local while others are remote. All of these configurations are contemplated herein.

Also, the figures show a number of blocks with functionality ascribed to each block. It will be noted that fewer blocks can be used so the functionality is performed by fewer components. Also, more blocks can be used with the functionality distributed among more components.

It will be noted that the above discussion has described a variety of different systems, components and/or logic. It will be appreciated that such systems, components and/or logic can be comprised of hardware items (such as processors and associated memory, or other processing components, some of which are described below) that perform the functions associated with those systems, components and/or logic. In addition, the systems, components and/or logic can be comprised of software that is loaded into a memory and is subsequently executed by a processor or server, or other computing component, as described below. The systems, components and/or logic can also be comprised of different combinations of hardware, software, firmware, etc., some examples of which are described below. These are only some examples of different structures that can be used to form the systems, components and/or logic described above. Other structures can be used as well.

Figure 7:
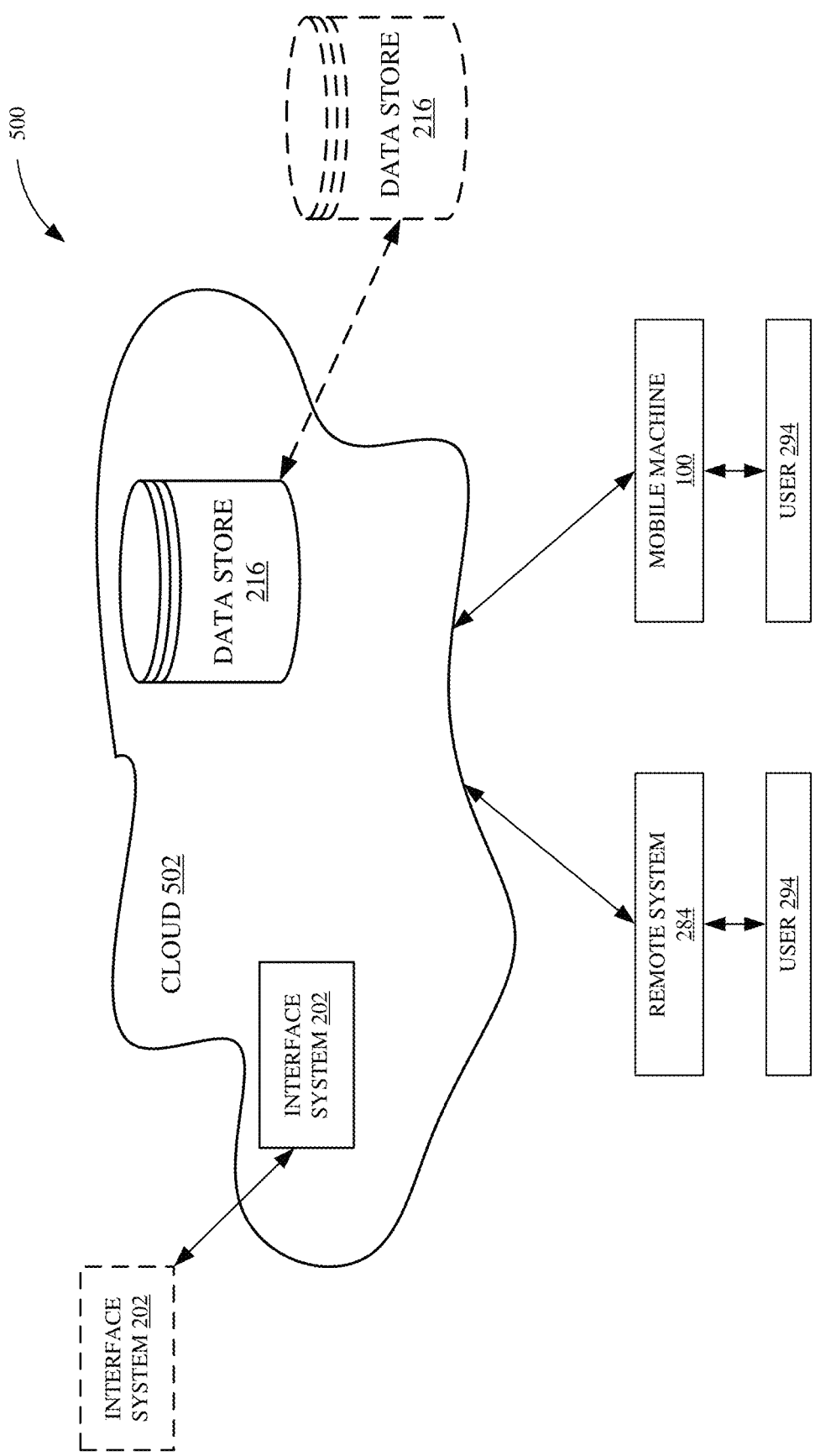
FIG. 7 is a block diagram showing an example remote server architecture.

FIG. 7 is a block diagram of machine 100, shown in FIG. 2, except that it communicates with elements in a remote server architecture 500. In one example, remote server architecture 500 can provide computation, software, data access, and storage services that do not require end-user knowledge of the physical location or configuration of the system that delivers the services. In various examples, remote servers can deliver the services over a wide area network, such as the internet, using appropriate protocols. For instance, remote servers can deliver applications over a wide area network and they can be accessed through a web browser or any other computing component. Software or components shown in FIG. 2 as well as the corresponding data, can be stored on servers at a remote location. The computing resources in a remote server environment can be consolidated at a remote data center location or they can be dispersed. Remote server infrastructures can deliver services through shared data centers, even though they appear as a single point of access for the user. Thus, the components and functions described herein can be provided from a remote server at a remote location using a remote server architecture. Alternatively, they can be provided from a conventional server, or they can be installed on client devices directly, or in other ways.

In the example shown in FIG. 7, some items are similar to those shown in FIG. 2 and they are similarly numbered. FIG. 7 specifically shows that interface system 202 and datastore 216 can be located at a remote server location 502. Therefore, machine 100 accesses those systems through remote server location 502.

FIG. 7 also depicts another example of a remote server architecture. FIG. 7 shows that it is also contemplated that some elements of FIG. 2 are disposed at remote server location 502 while others are not. By way of example, datastore 216 or interface system 202 can be disposed at a location separate from location 502, and accessed through the remote server at location 502. Regardless of where they are located, they can be accessed directly by machine 100, through a network (either a wide area network or a local area network), they can be hosted at a remote site by a service, or they can be provided as a service, or accessed by a connection service that resides in a remote location. Also, the data can be stored in substantially any location and intermittently accessed by, or forwarded to, interested parties. For instance, physical carriers can be used instead of, or in addition to, electromagnetic wave carriers. In such an example, where cell coverage is poor or nonexistent, another mobile machine (such as a fuel truck) can have an automated information collection system. As mobile machine 100 comes close to the fuel truck for fueling, the system automatically collects the information from the harvester using any type of ad-hoc wireless connection. The collected information can then be forwarded to the main network as the fuel truck reaches a location where there is cellular coverage (or other wireless coverage). For instance, the fuel truck may enter a covered location when traveling to fuel other machines or when at a main fuel storage location. All of these architectures are contemplated herein. Further, the information can be stored on the mobile machine until the mobile machine enters a covered location. The mobile machine, itself, can then send the information to the main network.

It will also be noted that the elements of FIG. 2, or portions of them, can be disposed on a wide variety of different devices. Some of those devices include servers, desktop computers, laptop computers, tablet computers, or other mobile devices, such as palm top computers, cell phones, smart phones, multimedia players, personal digital assistants, etc.

Figure 8:
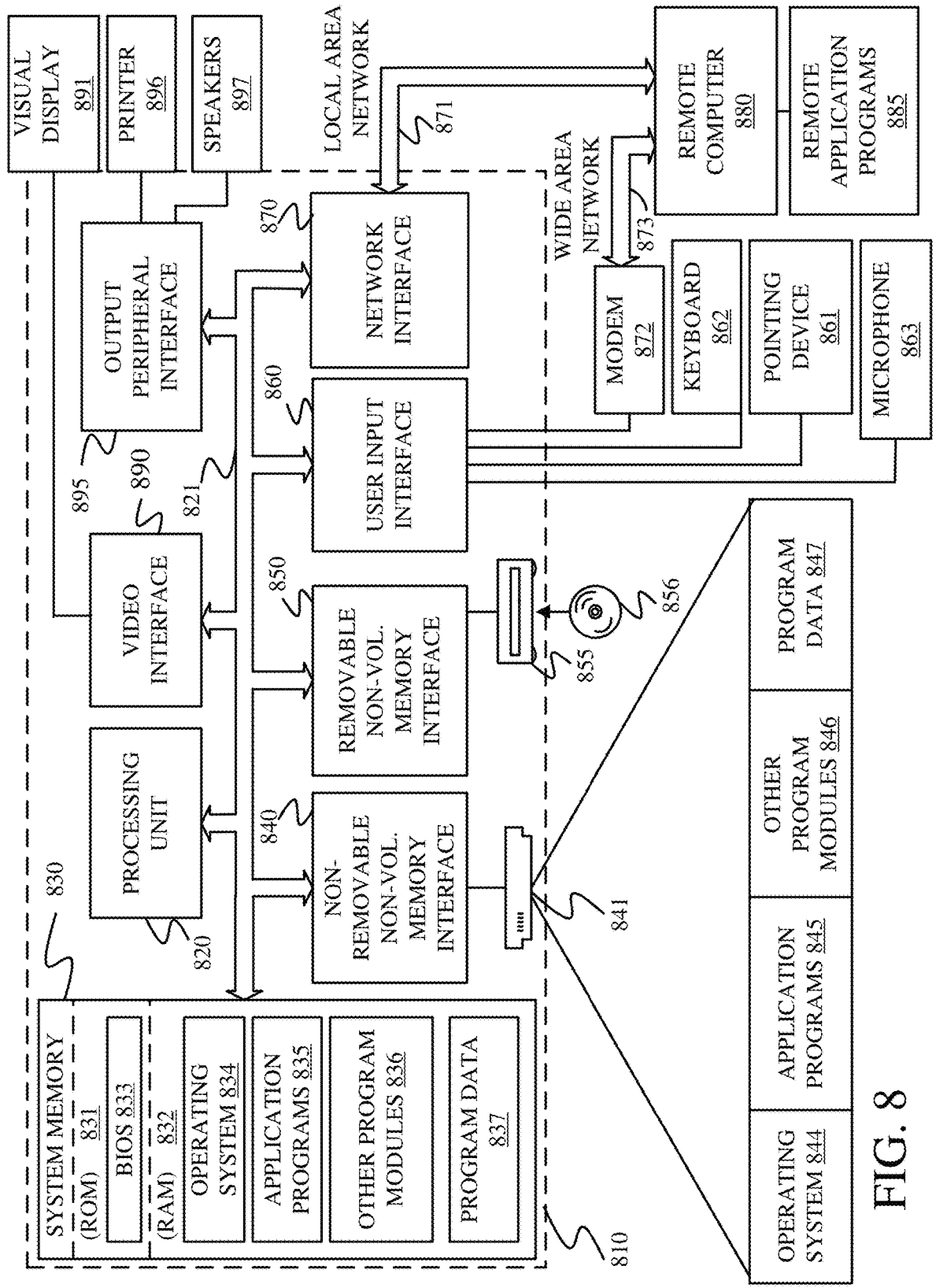
FIG. 8 is a block diagram showing an example computing environment.

FIG. 8 is one example of a computing environment in which elements of previous FIGS., or parts of it, (for example) can be deployed. With reference to FIG. 8, an exemplary system for implementing some embodiments includes a computing device in the form of a computer 810 programmed to operate as discussed above. Components of computer 810 may include, but are not limited to, a processing unit 820 (which can comprise processors or servers from previous FIGS.), a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. Memory and programs described with respect to previous FIGS. can be deployed in corresponding portions of FIG. 8.

Computer 810 typically includes a variety of computer readable media. Computer readable media can be any available media that can be accessed by computer 810 and includes both volatile and nonvolatile media, removable and non-removable media. By way of example, and not limitation, computer readable media may comprise computer storage media and communication media. Computer storage media is different from, and does not include, a modulated data signal or carrier wave. It includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 810. Communication media may embody computer readable instructions, data structures, program modules or other data in a transport mechanism and includes any information delivery media. The term "modulated data signal" means a signal that has one or more of its characteristics set or changed in such a manner as to encode information in the signal.

The system memory 830 includes computer storage media in the form of volatile and/or nonvolatile memory such as read only memory (ROM) 831 and random-access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 8 illustrates operating system 834, application programs 835, other program modules 836, and program data 837.

The computer 810 may also include other removable/non-removable volatile/nonvolatile computer storage media. By way of example only, FIG. 8 illustrates a hard disk drive 841 that reads from or writes to non-removable, nonvolatile magnetic media, an optical disk drive 855, and nonvolatile optical disk 856. The hard disk drive 841 is typically connected to the system bus 821 through a non-removable memory interface such as interface 840, and optical disk drive 855 are typically connected to the system bus 821 by a removable memory interface, such as interface 850.

Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (e.g., ASICs), Application-specific Standard Products (e.g., ASSPs), System-on-a-chip systems (SOCs), Complex Programmable Logic Devices (CPLDs), etc.

The drives and their associated computer storage media discussed above and illustrated in FIG. 7, provide storage of computer readable instructions, data structures, program modules and other data for the computer 810. In FIG. 8, for example, hard disk drive 841 is illustrated as storing operating system 844, application programs 845, other program modules 846, and program data 847. Note that these components can either be the same as or different from operating system 834, application programs 835, other program modules 836, and program data 837.

A user may enter commands and information into the computer 810 through input devices such as a keyboard 862, a microphone 863, and a pointing device 861, such as a mouse, trackball or touch pad. Other input devices (not shown) may include a joystick, game pad, satellite dish, scanner, or the like. These and other input devices are often connected to the processing unit 820 through a user input interface 860 that is coupled to the system bus, but may be connected by other interface and bus structures. A visual display 891 or other type of display device is also connected to the system bus 821 via an interface, such as a video interface 890. In addition to the monitor, computers may also include other peripheral output devices such as speakers 897 and printer 896, which may be connected through an output peripheral interface 895.

The computer 810 is operated in a networked environment using logical connections (such as a controller area network-CAN, local area network -LAN, or wide area network WAN) to one or more remote computers, such as a remote computer 880.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. In a networked environment, program modules may be stored in a remote memory storage device. FIG. 7 illustrates, for example, that remote application programs 885 can reside on remote computer 880.

It will be noted that the above discussion has described a variety of different systems, components and/or logic. It will be appreciated that such systems, components and/or logic can be comprised of hardware items (such as processors and associated memory, or other processing components, some of which are described below) that perform the functions associated with those systems, components and/or logic. In addition, the systems, components and/or logic can be comprised of software that is loaded into a memory and is subsequently executed by a processor or server, or other computing component, as described below. The systems, components and/or logic can also be comprised of different combinations of hardware, software, firmware, etc., some examples of which are described above. These are only some examples of different structures that can be used to form the systems, components and/or logic described above. Other structures can be used as well.

It should also be noted that the different examples described herein can be combined in different ways. That is, parts of one or more examples can be combined with parts of one or more other examples. All of this is contemplated herein.

Example 1 is a mobile agricultural machine comprising:
ground engaging elements that propel the mobile agricultural machine about an agricultural field;
a processor that receives field data indicative of characteristics of portions of the field;
a display unit operably coupled to the processor, the display unit configured to display a user interface generated by the processor, the user interface comprising:
a map comprising a plurality of field characteristic indicia, the field characteristic indicia indicative of the characteristics of the portions of the field and the locations of the portions of the field;

a data distribution indicator representing a distribution of the field data; and a legend proximate the data distribution indicator.

Example 2 is the mobile agricultural machine of any or all previous examples wherein the data distribution indicator comprises a histogram.

Example 3 is the mobile agricultural machine of claim 2 wherein the adjustable legend comprises a continuous scale and a first scale adjuster and second scale adjuster.

Example 4 is the mobile agricultural machine of any or all previous examples wherein the adjustable legend comprises a third scale adjuster and wherein the first scale adjust corresponds to a minimum data value displayed on the map, the second scale adjuster corresponds to a maximum data value displayed on the map and the third scale adjuster corresponds to a medial data value displayed on the map.

Example 5 is the mobile agricultural machine of any or all previous examples wherein the adjustable legend comprises a plurality of bins, each of the bins in the plurality of bins corresponding to a range of values.

Example 6 is the mobile agricultural machine of any or all previous examples wherein each bin has at least one adjustment mechanism that, when actuated, modifies the range of values for the given bin.

Example 7 is the mobile agricultural machine of any or all previous examples wherein each bin has a distinct visual characteristic.

Example 8 is the mobile agricultural machine of any or all previous examples wherein the plurality of bins are overlaid the data distribution indicator.

Example 9 is the mobile agricultural machine of any or all previous examples wherein the user interface comprises: a bin modification element that adds or removes bins from the plurality of bins.

Example 10 is the mobile agricultural machine of any or all previous examples wherein the plurality of bins are initially automatically distributed along the data distribution.

Example 11 is the mobile agricultural machine of any or all previous examples further comprising a sensor that senses the characteristics of portions of the field as the mobile agricultural machine is propelled about the field and wherein the processor receives the field data from the sensor.

Example 12 is an agricultural user interface system displayed on a display, the agricultural user interface comprising:

a map of an agricultural field;

a plurality of indicia on the map, the indicia indicative of a characteristic of the agricultural field at the position of the indicia on the map;

an interactive legend indicative of values of the indicia; and a data distribution element indicative of a data distribution of values of the characteristics of the agricultural field.

Example 13 is the agricultural user interface system of any or all previous examples wherein the interactive legend comprises a plurality of bins, each bin corresponding to a visually distinct set of the plurality of indicia.

Example 14 is the agricultural user interface system of any or all previous examples wherein the data distribution element is display proximate the plurality of bins such that the bins are aligned with the data they represent in the data distribution.

Example 15 is the agricultural user interface system of any or all previous examples wherein the plurality of bins and the data distribution are displayed overlapping one another.

Example 16 is the agricultural user interface system of any or all previous examples wherein the plurality of bins include bin adjustment mechanisms that actuate to adjust a value range associated with the bin.

Example 17 is the agricultural user interface system of any or all previous examples wherein the interactive legend comprises:

a continuous scale;

an actuatable minimum reference point that can be actuated to adjust a minimum value on the continuous scale to be displayed as a minimum indicia on the map;

an actuatable medium reference point; and an actuatable maximum reference point that can be actuated to adjust a maximum value on the continuous scale to be displayed as a maximum indicia on the map;

Example 18 is a method of generating an agricultural user interface display comprising:

receiving field data indicative of agricultural characteristics across a field;

determining a data value distribution for the field data;

generating a data distribution interface element indicative of the data value distribution of the field data;

generating an interactive legend interface element, a portion of the interactive interface element associating visual indicia with field data values;

generating a map based on the field data and the visual indicia;

displaying the map, the data distribution interface element and the interactive legend interface element on a display.

Example 19 is the method of generating the agricultural user interface display of any or all previous examples wherein displaying the data distribution interface element component comprises: generating a histogram indicative of the data value distribution and displaying the histogram.

Example 20 is the method of generating the agricultural user interface display of any or all previous examples wherein displaying the interactive legend interface element comprises: overlaying the interactive legend interface on the data distribution interface element.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A mobile agricultural machine comprising:
    wheels or tracks that are driveable to propel the mobile agricultural machine about an agricultural field;
    one or more processors that receive field data indicative of georeferenced values of a characteristic; and
    a display unit operably coupled to the one or more processors, the display unit configured to display a user interface generated by the one or more processors, the user interface comprising:
        a map of the agricultural field comprising a plurality of field characteristic indicia, each field characteristic indicium of the plurality of field characteristic indicia corresponding to a respective range of values of the characteristic and placed at a location in the map of the agricultural field to indicate the respective range of values of the characteristic at the location in the map;
        a first histogram representing a distribution of the georeferenced values of the characteristic in the field data, the first histogram comprising a plurality of bars, each bar of the plurality of bars indicating a respective frequency with which each value, of the georeferenced values of the characteristic, is present in the field data;

an adjustable legend overlaying the first histogram, the adjustable legend comprising a second histogram comprising a plurality of bins, each bin in the plurality of bins corresponding to a respective range of values of the georeferenced values of the characteristic and each bin in the plurality of bins indicating a respective frequency with which the corresponding respective range of values occurs in the field data; and adjustment mechanisms that are adjustable to modify ranges of values of the plurality of bins.

2. The mobile agricultural machine of claim 1, wherein each bin in the plurality of bins includes at least one corresponding adjustment mechanism that defines the respective range of values to which the corresponding bin corresponds.

3. The mobile agricultural machine of claim 2, wherein each adjustment mechanism is actuatable to adjust the respective range of values to which the corresponding bin corresponds.

4. The mobile agricultural machine of claim 1, wherein each bin display element is stylized with the field characteristic indicia corresponding to ranges of values to which the bin corresponds.

5. The mobile agricultural machine of claim 1, wherein the user interface further comprises:

a plurality of actuatable field characteristic indicium adjusters, each actuatable field characteristic indicium adjuster, of the plurality of actuatable field characteristic indicium adjusters, actuatable to adjust an appearance of a corresponding one of the plurality of field characteristic indicia.

6. The mobile agricultural machine of claim 5, wherein the user interface further comprises:

an even break selector that is actuatable to generate the plurality of bins such that each bin, of the plurality of bins is of equivalent size as other bins of the plurality of bins.

7. The mobile agricultural machine of claim 1, wherein the user interface comprises:

a bin modification element that adds or removes bins from the plurality of bins.

8. The mobile agricultural machine of claim 4, wherein each bin, of the plurality of bins, is initially automatically assigned to a range of values.

9. The mobile agricultural machine of claim 1 and further comprising a sensor that senses the characteristic as the mobile agricultural machine is propelled about the agricultural field and wherein the one or more processors receive the field data from the sensor.

10. A system comprising:
one or more processors;
a display coupled to the one or more processors, the display configured to display an agricultural user interface generated by the one or more processors, the agricultural user interface comprising:
a map of an agricultural field;
a histogram indicative of a data distribution of values of a characteristic of the agricultural field;
a continuous indicia gradient comprising a plurality of indicium that spans a width of the histogram and indicates the one or more values, of the values of the characteristic of the agricultural field, that each indicium represents;
a plurality of indicia elements on the map, each indicia element, of the plurality of indicia elements, representing a respective indicium of the continuous indicia gradient and indicative of one or more values, of the values of the characteristic of the agricultural field, at a respective position on the map; and
a plurality of adjustment mechanisms that are interactable to control a number of indicium, of the plurality of indicium, that are represented by indicia elements on the map, the plurality of adjustment mechanisms overlaying the histogram and the continuous indicia gradient and comprising: a minimum reference point adjustment mechanism to control a minimum value, of the values of the characteristic of the agricultural field, a maximum reference point adjustment mechanism to control a maximum value, of the values of the characteristic of the agricultural field, and a medium reference point adjustment mechanism, disposed between the minimum reference point adjustment mechanism and the maximum reference point.

11. The system of claim 10 and further comprising:
a plurality of indicator elements separated from the continuous indicia gradient, wherein each indicator element corresponds to an indicia element, of the plurality of indicia elements, and indicates the one or more values, of the values of the characteristic of the agricultural field, represented by the corresponding indicia element.

12. The system of claim 11, wherein the continuous indicia gradient comprises a continuous color gradient comprising, as the plurality of indicium, a plurality of colors.

13. The system of claim 11, wherein the continuous indicia gradient is displayed above the data distribution element.

14. The system of claim 10, wherein the medium reference point adjustment mechanism is interactable to control a number of indicium, of the plurality of indicium, available for values of the histogram between the minimum reference point adjustment mechanism and the medium reference point adjustment mechanism and a number of indicium, of the plurality of indicium, available for values of the data distribution between the maximum reference point adjustment mechanism and the medium reference point adjustment mechanism.

15. A method of generating an agricultural user interface display comprising:

receiving field data indicative of values of an agricultural characteristic across a field;

determining a data value distribution for values of the agricultural characteristic across the field;

generating a first histogram based on the data value distribution, the first histogram comprising a plurality of bars, each bar of the plurality of bars indicating a respective frequency with which each value, of the values of the agricultural characteristic, is present in the field data;

generating an interactive legend interface element comprising a second histogram comprising a plurality of bins, each bin in the plurality of bins having a respective different visual indicium, each bin in the plurality of bins corresponding to a respective range of values, of the values of the agricultural characteristic, and each bin in the plurality of bins indicating a respective frequency with which the corresponding respective range of values occurs in the field data;

generating adjustment mechanisms, the adjustment mechanisms adjustable to modify ranges of values of the plurality of bins;

generating a map based on the field data and the respective different visual indicium of each bin in the plurality of bins;

generating the agricultural user interface display comprising the map, the first histogram, the second histogram, and the adjustment mechanisms, wherein the second histogram overlays the first histogram; and displaying the agricultural user interface display.

16. The method of generating the agricultural user interface display of claim 15, wherein each bin is transparent.

17. The method of generating the agricultural user interface display of claim 16 and further comprising:

generating a plurality of actuatable indicium adjusters, each actuatable indicium adjuster actuatable to adjust an appearance of a visual indicium of a bin.

* * * * *